United States Patent
Hahn et al.

(10) Patent No.: US 7,437,714 B1
(45) Date of Patent: Oct. 14, 2008

(54) CATEGORY PARTITIONING MARKUP LANGUAGE AND TOOLS

(75) Inventors: Christopher Hahn, Bellevue, WA (US); Quan To, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 517 days.

(21) Appl. No.: 10/700,995

(22) Filed: Nov. 4, 2003

(51) Int. Cl.
*G06F 9/44* (2006.01)

(52) U.S. Cl. .................................... 717/124

(58) Field of Classification Search ........... 717/101, 717/105, 124–126, 131, 136; 714/33, 38, 714/40, 738, 741; 715/30, 704, 530; 702/186, 702/120
See application file for complete search history.

(56) References Cited

U.S. PATENT DOCUMENTS

| | | | | |
|---|---|---|---|---|
| 2002/0032706 | A1* | 3/2002 | Perla et al. | 707/530 |
| 2003/0097650 | A1* | 5/2003 | Bahrs et al. | 717/124 |
| 2003/0163802 | A1* | 8/2003 | Takahashi | 717/136 |
| 2004/0041827 | A1* | 3/2004 | Bischof et al. | 345/704 |
| 2004/0128584 | A1* | 7/2004 | Mandava et al. | 714/38 |
| 2004/0205567 | A1* | 10/2004 | Nielsen | 715/513 |

* cited by examiner

*Primary Examiner*—Tuan Anh Vu
(74) *Attorney, Agent, or Firm*—Birch, Stewart, Kolasch & Birch, LLP

(57) ABSTRACT

A system for testing software modules is provided. A user enters parameter values that will be tested into a spreadsheet. The spreadsheet application generates an XML data file including the parameter values arranged into a table. A test shell extracts test cases from the XML data file and converts the data into a testing object for use by a test engine.

16 Claims, 4 Drawing Sheets

```xml
<?xml version="1.0" encoding="utf-8" ?>
<xs:schema targetNamespace="http://tempuri.org/XMLSchema.xsd"
    elementFormDefault="qualified"
    xmlns="http://tempuri.org/XMLSchema.xsd"
    xmlns:mstns="http://tempuri.org/XMLSchema.xsd"
    xmlns:xs="http://www.w3.org/2001/XMLSchema">

<xs:element name="CTableList">
        <xs:complexType>
            <xs:sequence>

<xs:element name="CTable" minOccurs="1" maxOccurs="*">
                    <xs:complexType>
                        <xs:sequence>
                            <xs:element name="paramname" type="xs:string" minOccurs="1" maxOccurs="*"></xs:element>
                            <xs:element name="test" minOccurs="1" maxOccurs="*">
                                <xs:complexType>
                                    <xs:sequence>
                                        <xs:element name="param" type="xs:string" minOccurs="1" maxOccurs="*" />
                                    </xs:sequence>
                                    <xs:attribute name="caseid" type="xs:string" />
                                    <xs:attribute name="inTCM" type="xs:positiveInteger" />
                                </xs:complexType>
                            </xs:element>

<!-- This attribute goes with CTable -->
                            <xs:attribute name="name" type="xs:string" />
                        </xs:sequence>
                    </xs:complexType>
                </xs:element>

<!-- This attribute goes with CTableList -->
                <xs:attribute name="name" type="xs:string" />
            </xs:sequence>
        </xs:complexType>
    </xs:element>
</xs:schema>
```

Figure 4

CATEGORY PARTITIONING MARKUP LANGUAGE AND TOOLS

FIELD OF THE INVENTION

Aspects of the present invention relate to software testing. More specifically, aspects of the present invention provide a mechanism for formatting testing parameter values and systems for using testing parameter values.

BACKGROUND

Testing systems and methods have been developing for testing software modules, such as application programming interfaces (APIs). It is common to group testing parameters into equivalency classes and then test selected parameters from each equivalency class. For example, if a developer determines that a software module is likely to either function properly or improperly for all positive integer values of a parameter, the developer may create an equivalency class of positive integer values and test one positive integer value of the parameter. It will then be assumed that if the software module functions properly, the software module will also function properly for other positive integer values.

One prior art approach to testing software modules has included creating objects that test the parameters and parameter combinations selected by the developer. Among other drawbacks, this approach requires developers to create and compile new objects when the developer wishes to test new parameters, parameter values and parameter combinations. Furthermore, new objects must be created and compiled to test new logic when the software module is modified.

Therefore, there is a need in the art for systems and methods that allow developers to test software modules without requiring the developers to create and compile objects to test new parameter values and parameter value combinations.

BRIEF SUMMARY

Aspects of the present invention address one or more of the issues mentioned above by providing a system for testing software modules that includes an XML data file. The XML data file may include a table of testing parameter values. A test shell extracts test parameter values from the XML data file and creates testing objects for use by a test engine. The disclosed system simplifies testing and reduces maintenance costs by allowing developers to change testing parameters and parameter values by changing the values in the XML data file. In one embodiment of the invention, the XML data file is created with a spreadsheet application.

BRIEF DESCRIPTION OF THE DRAWINGS

Aspects of the present invention are described with respect to the accompanying figures, in which like reference numerals identify like elements, and in which:

FIG. 4 shows an exemplary XML schema for formatting XML data files, in accordance with an embodiment of the invention.

DETAILED DESCRIPTION

Exemplary Operating Environment

Figure 1:
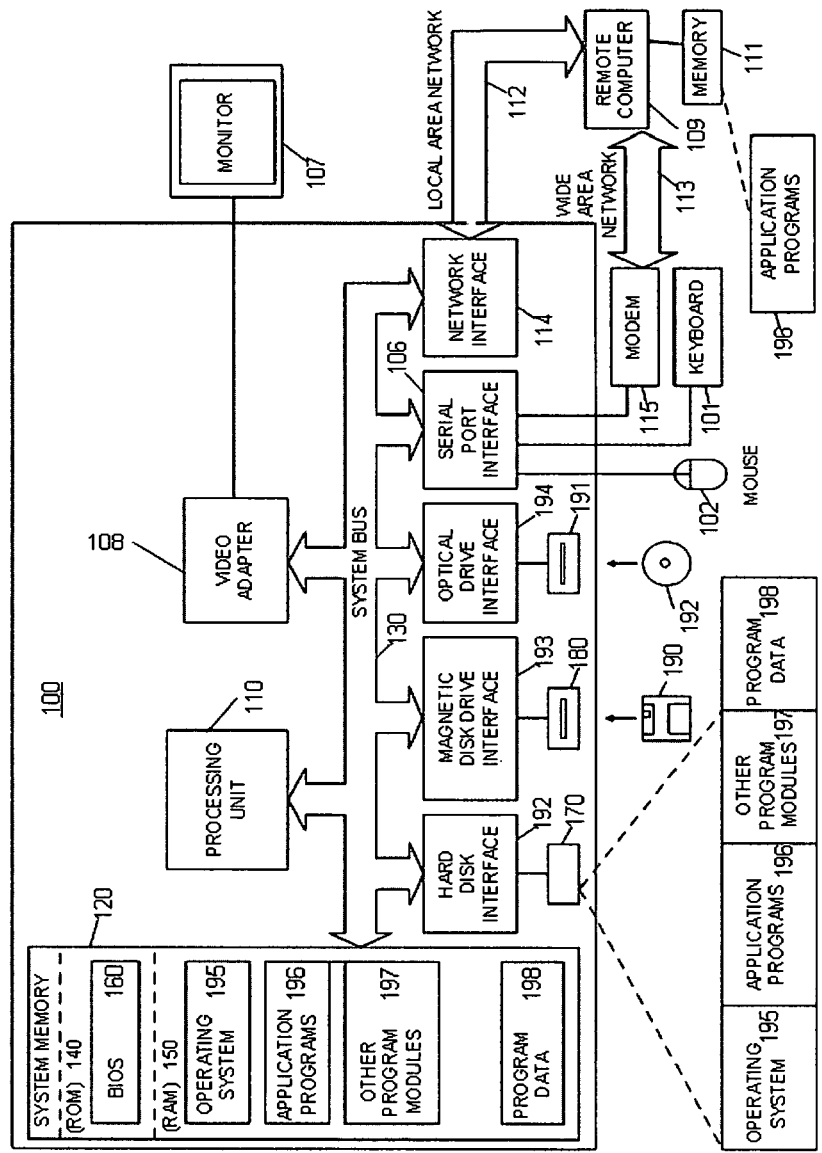
FIG. 1 shows a functional block diagram of a conventional general-purpose computer system.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or another common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of the various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

DESCRIPTION OF ILLUSTRATIVE EMBODIMENTS

Figure 2:
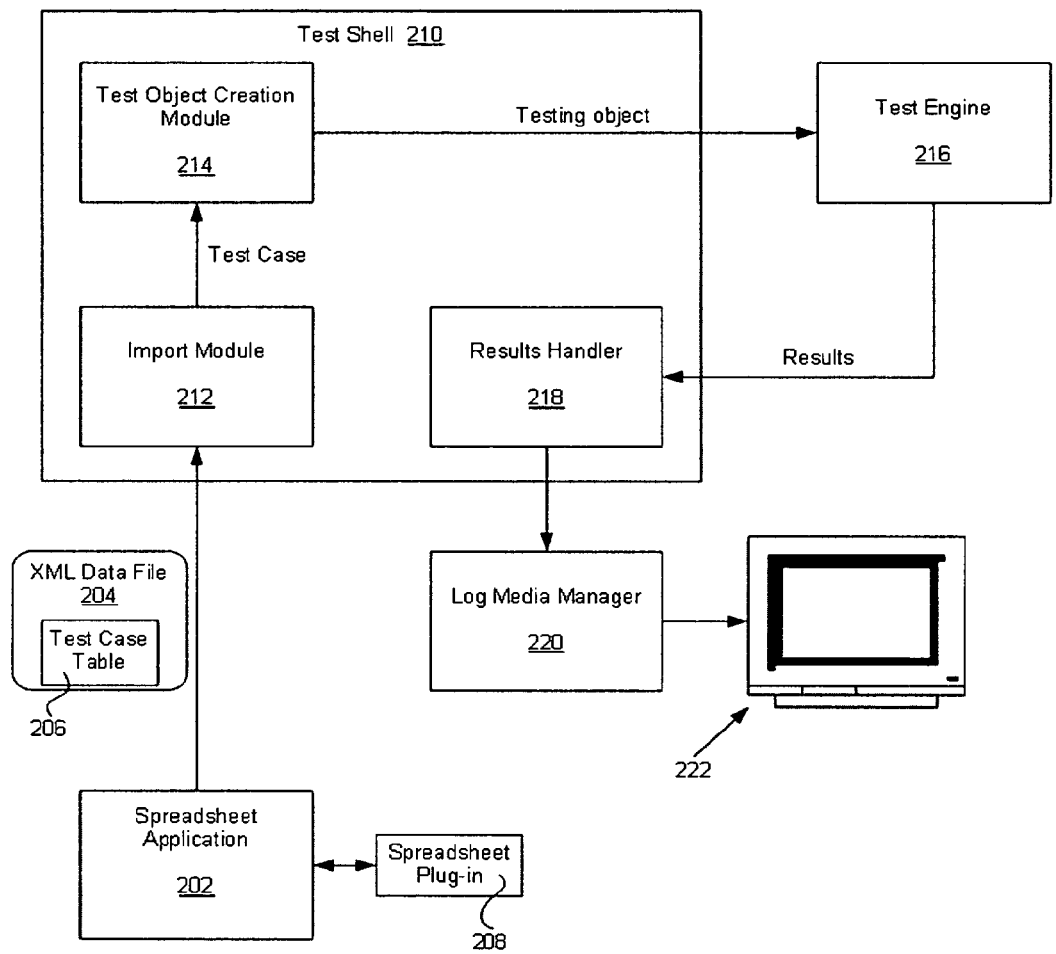
FIG. 2 shows a system for testing software modules, in accordance with an embodiment of the invention.

FIG. 2 shows a system for testing software modules in accordance with an embodiment of the invention. In one embodiment of the invention, the system shown in FIG. 2 is used to test application programming interfaces (APIs). A spreadsheet application 202 may be used to generate an extensible markup language (XML) data file 204 that includes a test case table 206. Spreadsheet application 202 may use a spreadsheet plug-in 208 when generating XML data file 204. The spreadsheet plug-in may also perform other functions, such as loading and saving XML data files.

Figure 3:
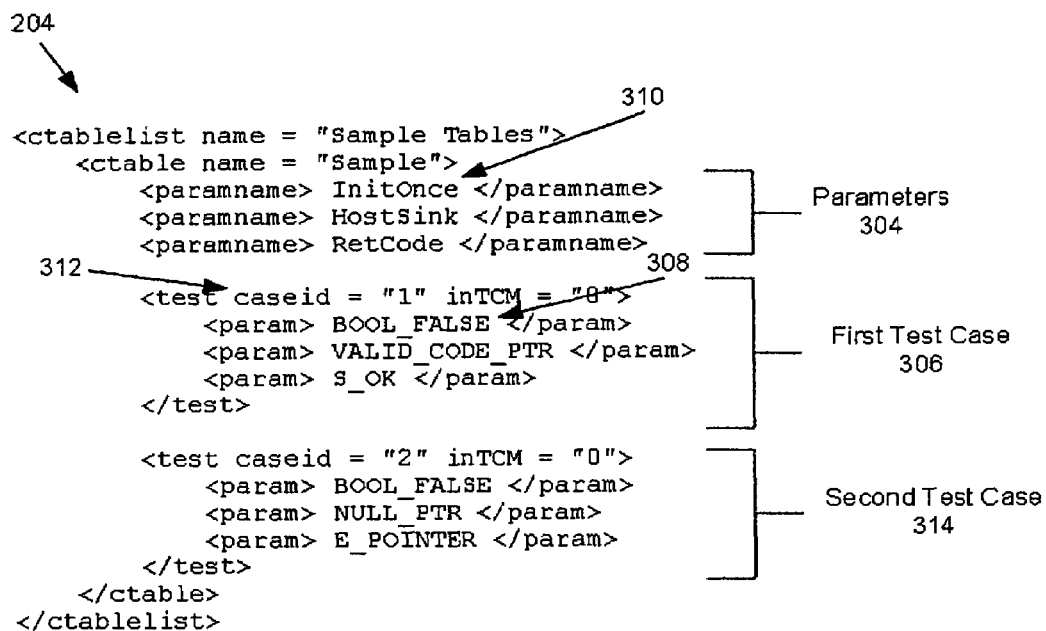
FIG. 3 shows an exemplary XML data file that includes test data, in accordance with an embodiment of the invention.

FIG. 3 illustrates an exemplary XML data file 204. XML data file 204 includes a parameter section 304 that lists individual parameters. In the embodiment shown, parameters are listed between "paramname" tags. XML data file 204 includes a first test case section 306 that includes individual values assigned to the parameters listed in section 304. The order of the parameter values included in first test case section 306 corresponds to the order of the parameter names listed in parameter section 304. For example, the value "Bool_False" 308 is the value assigned to the parameter "InitOnce" 310 for first test case. The first test case is identified with a test case ID 312. Additional test cases may also include test case IDs. XML data file 204 includes a second test case section 314 that includes parameter values for a second test case.

The data structure shown in FIG. 3 may include several additional table elements corresponding to additional test cases. Moreover, several additional parameters and parameter values may also be included. In one alternative embodiment in the invention, the order of parameter values listed in individual test cases is not required to correspond to the order of the parameters listed in parameter section 304. Name attributes may be added to the parameter tags to associate the parameter values for individual test cases to the parameters identified in parameter section 304. One of the advantages of listing parameter values for individual test cases in the same order as the parameters listed in parameter section 304 is that the amount of information that must be included within a data file is minimized. That is, the identification of the parameter that will be assigned a given parameter value is assumed by the order of the parameter value.

The data structure shown in FIG. 3 is formatted with XML. One skilled in the art will appreciate that other markup languages may also be used to implement aspects of the invention. When XML is used to format parameter values and parameter value combinations for a plurality of test cases, the data structure may be formatted in accordance with the schema shown in FIG. 4. Of course, alternative schemas may also be used.

Returning to FIG. 2, XML data file 204 is transmitted to a test shell 210 that may be used to generate testing objects. An import module 212 may receive XML data file 204 and validates the parameter values and parameter value combinations included within the table. For example, if a parameter can only be assigned integer values, validation may include verifying that all of the parameter values for that parameter are assigned integer values. Validation may be performed when data file 204 is received or may be performed as individual cases are utilized. Import module 212 and may also extract individual test cases and transmit those test cases to a test object creation module 214. Test object creation module 214 may then format the parameter values for the individual test cases into a standard testing object. Formatting may include, for example, changing character strings to values. An exemplary testing object may include a standard template library (STL) container. The structure of standard testing objects are well-known to those skilled in the art.

A testing engine 216 then receives the testing object, runs a test in the conventional manner and returns results from the test to a results handler 218. Results may include an indication of whether or not the test was successful as well as information describing what went wrong when the test was not successful. Results handler 218 may then transmit data to a log media manager 220 which may then generate information describing the results of the test. This information may be transmitted to a display device 222. In alternative embodiments, log media manager 220 may transmit information describing the results to a file, a database, an application or any other entity that is typically used in the art to manage test result information.

Among other advantages, the system shown in FIG. 2 allows software developers to test new parameters and new parameter values by merely changing XML data file 204. In embodiments that utilize spreadsheet application 202 to generate XML data file 204, testing new parameter values may include adding the new parameter values to a spreadsheet.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method of processing testing data for testing a software module, the method comprising:
 (a) extracting parameter value combinations from a data file formatted with a markup language, wherein the markup language implements an extensible markup representation of a table, the table representation comprising:
  (i) a first section that includes a set of testing parameters listed in a parameter order;
  (ii) a second section that includes a first set of parameter values listed in an order such that each value is positioned in the same order as the corresponding parameter is listed in the parameter order; and (iii) a third section that includes a second set of parameter values listed an order such that each value is positioned in the same order as the corresponding parameter is listed in the parameter order; wherein the second section parameter order and the third section parameter order represent the order of the parameter associated with a corresponding test case;
(b) generating a first test case based on the extracted parameter value combinations in the order represented by the first, second, or third section of the table representation;
(c) transmitting the first test case to a software module test engine;
(d) generating a first test result based on the first test case;
(e) integrating the first test result into corresponding section of the table representation of the data file;
(f) repeating steps (b)-(e) for a second test case in order to allow a test developer to create a set of related test cases based on an equivalence class model and to further test the software module in a rapid manner.

2. The method of claim 1, wherein the table representation comprises a plurality of test cases and each test case comprises a set of parameter value combinations.

3. The method of claim 2, wherein step (a) comprises extracting the plurality of test cases from the data file.

4. The method of claim 2, further including creating an object from a test case parameter value combination.

5. The method of claim 1, further including changing the format of the parameter value combinations before step (b).

6. The method of claim 1, further including:
(g) receiving the table representation at a spreadsheet application; and
(h) converting the table representation to the data file with a spreadsheet plug-in.

7. The method of claim 1, further including validating the parameter value combinations by comparing the parameter value combinations to a set of rules.

8. The method of claim 7, wherein parameter value combinations are validated on demand prior to step (b).

9. A computer-readable medium having stored thereon computer executable program for testing a software module, the computer program when executed causes a computer system to execute steps of:
(a) extracting parameter value combinations from a data file formatted with a markup language, wherein the markup language implements an extensible markup representation of a table, the table representation comprising:
(i) a first section that includes a set of testing parameters listed in a parameter order;
(ii) a second section that includes a first set of parameter values listed in an order such that each value is positioned in the same order as the corresponding parameter is listed in the parameter order; and
(iii) a third section that includes a second set of parameter values listed an order such that each value is positioned in the same order as the corresponding parameter is listed in the parameter order; wherein the second section parameter order and the third section parameter order represent the order of the parameter associated with a corresponding test case;
(b) generating a first test case based on the extracted parameter value combinations in the order represented by the first, second, or third section of the table representation;
(c) transmitting the first test case to a software module test engine;
(d) generating a first test result based on the first test case;
(e) integrating the first test result into corresponding section of the table representation of the data file;
(f) repeating steps (b)-(e) for a second test case in order to allow a test developer to create a set of related test cases based on an equivalence class model and to further test the software module in a rapid manner.

10. The computer-readable medium according to claim 9, wherein the table representation comprises a plurality of test cases and each test case comprises a set of parameter value combinations.

11. The computer-readable medium according to claim 10, wherein step (a) comprises extracting the plurality of test cases from the data file.

12. The computer-readable medium according to claim 10, further including creating an object from a test case parameter value combination.

13. The computer-readable medium according to claim 9, further including changing the format of the parameter value combinations before step (b).

14. The computer-readable medium according to claim 9, further including:
(g) receiving the table representation at a spreadsheet application; and
(h) converting the table representation to the data file with a spreadsheet plug-in.

15. The computer-readable medium according to claim 9, further including validating the parameter value combinations by comparing the parameter value combinations to a set of rules.

16. The computer-readable medium according to claim 15, wherein parameter value combinations are validated on demand prior to step (b).

* * * * *